United States Patent [19]
Beer et al.

[11] Patent Number: 5,607,637
[45] Date of Patent: Mar. 4, 1997

[54] METHOD OF MANUFACTURING A TRANSMISSION FLUID FILTER

[75] Inventors: Markus Beer, Morsbach, Germany; Kenneth V. Nelson, Barrington, Ill.

[73] Assignees: IBS Filtran GmbH, Lichtenberg, Germany; Filtran, Des Plaines, Ill.

[21] Appl. No.: 467,579

[22] Filed: Jun. 6, 1995

[51] Int. Cl.$^6$ .................................................. B29C 45/00
[52] U.S. Cl. ...................... 264/271.1; 264/328.1
[58] Field of Search ........................ 264/251, 252, 264/271.1, 328.1, 328.3; 277/1, 207 A, 181; 285/291, 379; 210/232, 445, 462, 463, 450, 168, 435

[56] References Cited

U.S. PATENT DOCUMENTS

| | | |
|---|---|---|
| 4,129,503 | 12/1978 | Joseph . |
| 4,136,011 | 1/1979 | Joseph et al. . |
| 4,214,781 | 7/1980 | Joseph . |
| 4,224,161 | 9/1980 | Anderson et al. . |
| 4,264,443 | 4/1981 | Anderson et al. . |
| 4,351,550 | 9/1982 | Anderson et al. . |
| 4,402,827 | 9/1983 | Joseph . |
| 4,417,383 | 11/1983 | Anderson et al. . |
| 4,450,081 | 5/1984 | Anderson et al. . |
| 4,472,861 | 9/1984 | Joseph et al. . |
| 4,509,340 | 4/1985 | Mullally et al. . |

FOREIGN PATENT DOCUMENTS

| | | | |
|---|---|---|---|
| 142116 | 8/1984 | Japan | 264/271.1 |
| 1236907 | 6/1971 | United Kingdom | 285/369 |

*Primary Examiner*—Matthew O. Savage
*Attorney, Agent, or Firm*—Barnes, Kissclle, Raisch, Choate, Whittemore & Hulbert, P.C.

[57] ABSTRACT

A plastic component including a plastic body having a first body portion and an integral tubular portion defining a tubular extension and a lip seal on the tubular body, the plastic body being formed in situ on the lip seal. The method of making the plastic component including providing a first mold cavity having a portion for defining the body of the component and a communicating second cavity for defining the tubular extension, positioning an annular lip seal in the cavity defining the tubular extension, and injecting molten plastic resin in the first cavity and the second cavity to define the plastic component with the lip seal positioned on the tubular extension.

2 Claims, 3 Drawing Sheets

METHOD OF MANUFACTURING A TRANSMISSION FLUID FILTER

This invention relates to transmission fluid filters and particularly to a component of such filters and a method of making said component.

BACKGROUND AND SUMMARY OF THE INVENTION

In transmission fluid filters, it has been common to make such transmission fluid filters in an assembly that includes a dished base member or pan of plastic or metal and second component made of plastic material with a filter media interposed between the two components. One of the components has an inlet and the other component has an outlet. Typical patents showing such a construction are U.S. Pat. Nos. 4,129,503, 4,136,011, 4,214,781, 4,224,161, 4,264,443, 4,351,550, 4,402,827, 4,417,383, 4,450,081, 4,472,861 and 4,509,340.

In one type of transmission filter, the outlet from a plastic component comprises an outlet tube with a seal thereon. The outlet is positioned in the pump inlet of a transmission. In making such a construction, the seal is mounted on the previously formed outlet tube.

Among the objectives of the present invention are to provide a transmission filter component and the method of making the component wherein the lip seal is not added by an additional or separate operation and wherein the need is eliminated for closely maintaining certain critical dimensions of the outer diameter of lip seal.

In accordance with the present invention, the plastic component is made by providing a first mold cavity having a portion for defining the body of the component and a communicating second cavity for defining the tubular extension, positioning an annular lip seal in the cavity defining the tubular extension, and injecting molten plastic resin in the first cavity and the second cavity to define the plastic component with the lip seal positioned on the tubular extension. Preferably, the method includes defining annular spaced recesses in the second cavity and the step of positioning the lip seal comprises positioning the lip seal between the annular recesses such that when the molten plastic resin is injected, annular ribs are formed in the recesses on the inside of the lip seal adjacent the tubular extension. The resultant plastic component comprises a plastic body, the plastic body comprising a first body portion and an integral tubular portion defining a tubular extension, a lip seal on the tubular body, the plastic body being formed in situ on the lip seal. The tubular extensions include spaced annular ribs formed in situ on the inside of the lip seal.

DESCRIPTION

Figure 1:
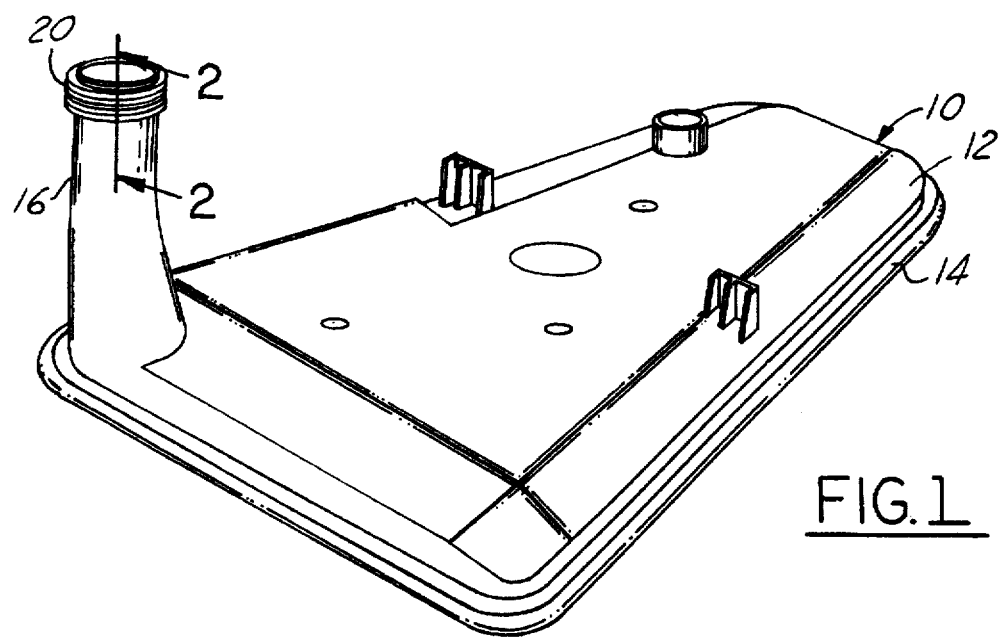
FIG. 1 is a perspective view of a plastic filter component embodying the invention.
Figure 2:
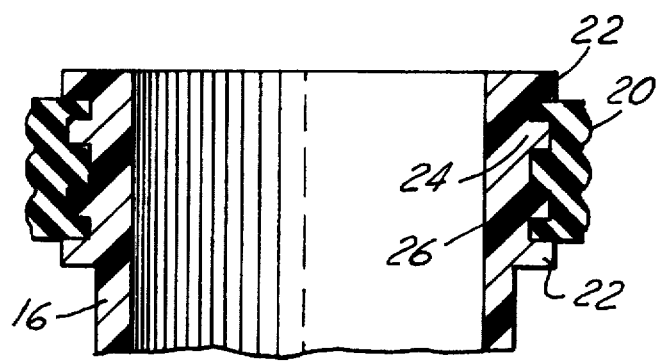
FIG. 2 is a sectional view taken along the line 2—2 in FIG. 1.
Figure 3:
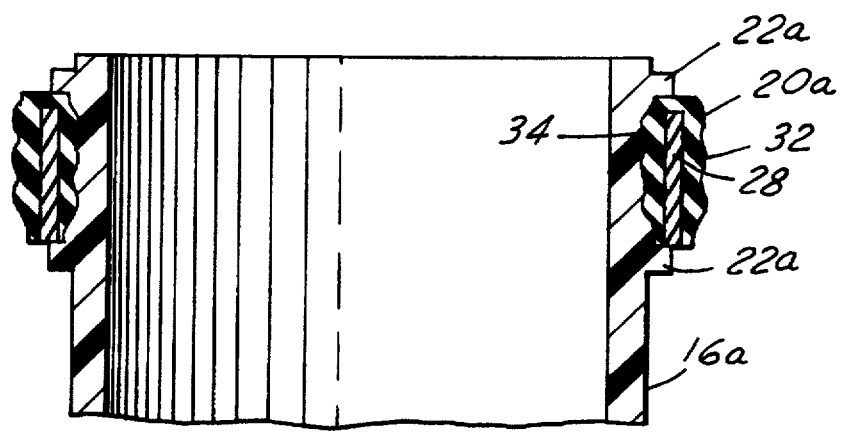
FIG. 3 is a sectional view of a modified form of component.

Referring to FIG. 1, the plastic component 10 of the transmission filter includes a pan-shaped central portion 12 and a peripheral portion 14 which assembled with a similar component in a manner well known in the art to form a transmission filter. The plastic component 10 includes an integral outlet 16 that has a peripheral annular seal 20 on the upper end thereof. Referring to FIG. 2, the peripheral seal 20 is positioned on the periphery of the free end of the tube 16 between flanges 22. Preferably, additional ribs 24, 26 are provided. As presently described, the tube 16 is formed in situ within the seal 20. In the modified form shown in FIG. 3, the seal 20a includes a reinforcing member 28 and an undulating inner and outer surface on the seal 20a as at 34, 32; the inner surface of the seal 34 corresponding with an undulating outer surface 32 on the outlet 16a between flanges 22a.

Figure 4:
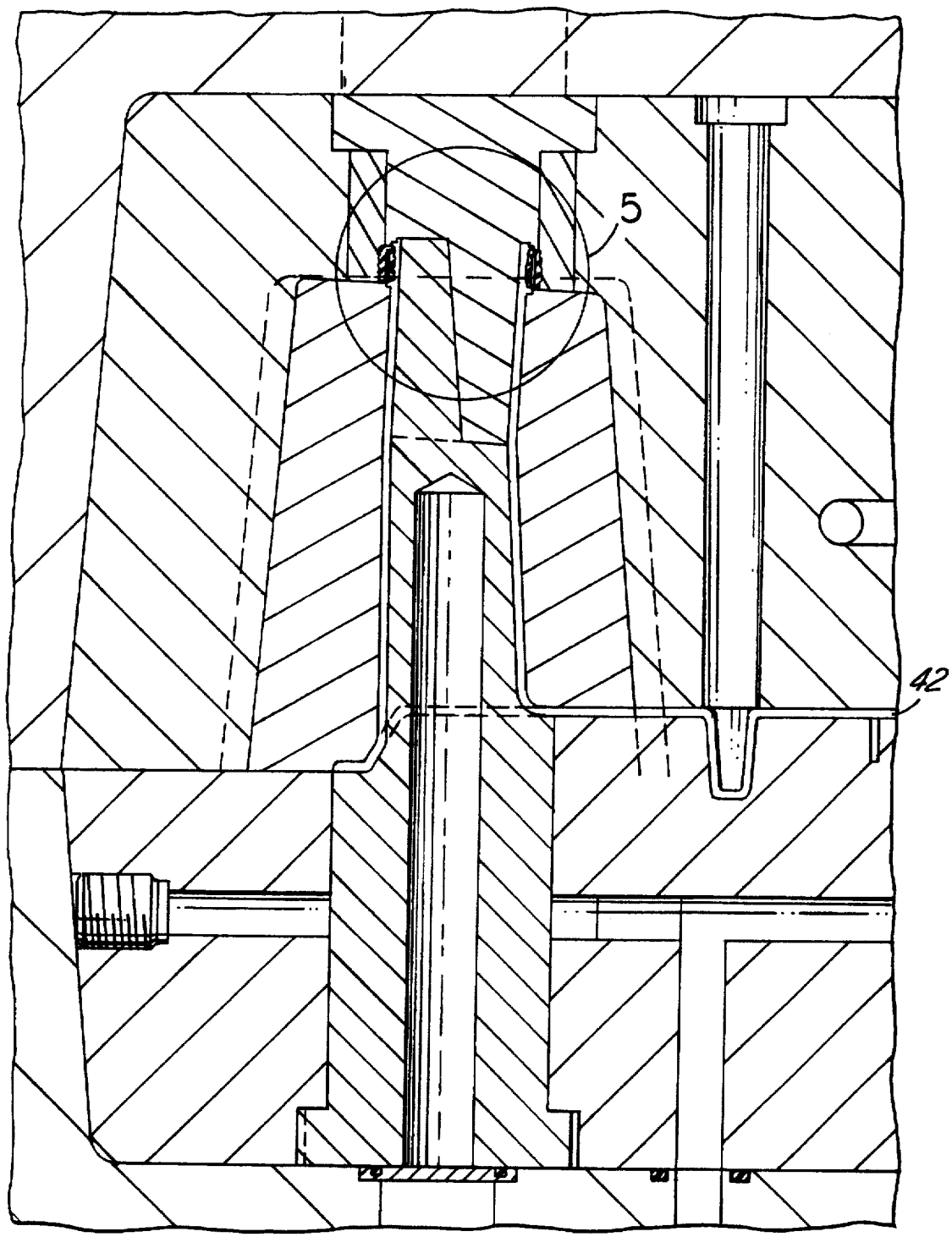
FIG. 4 is a sectional view of a mold for making the component.
Figure 5:
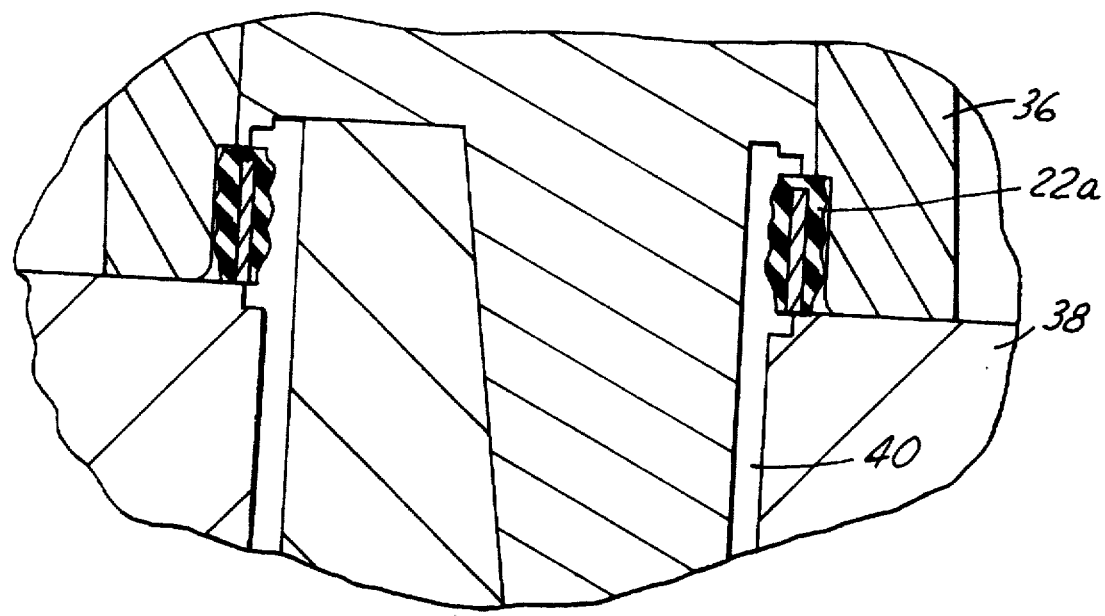
FIG. 5 is a sectional view taken along the circle 5 in FIG. 4 on an enlarged scale.
Figure 6:
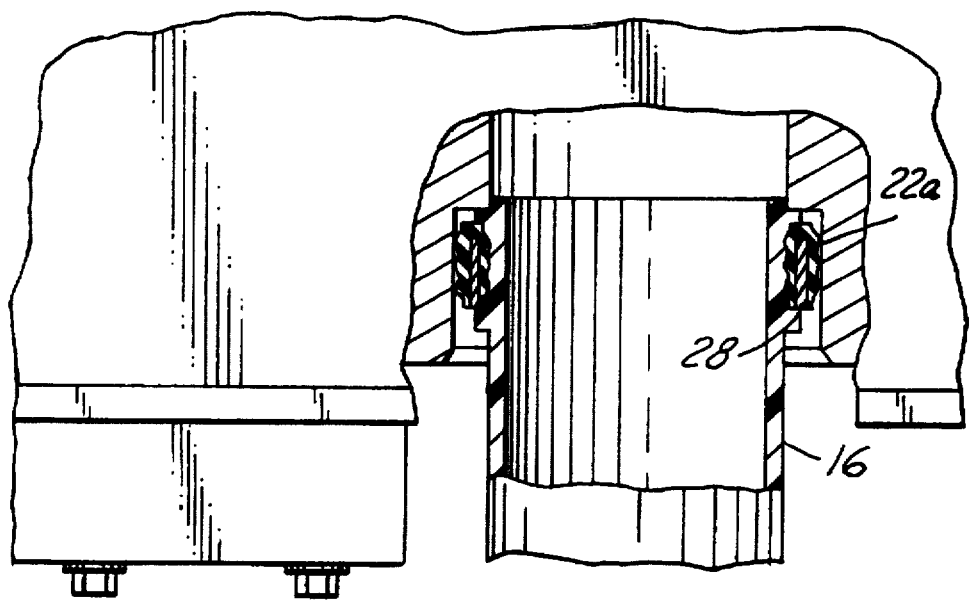
FIG. 6 is a fragmentary part sectional view of a plastic component in a transmission.

Referring to FIG. 4, there is shown an apparatus for forming the filter component 10 by injection molding molten plastic material within a cavity that supports the lip seal 20 or 20a. As shown in FIG. 5, one component 36 cooperates with another component 38 to support the lip seal 22a in position adjacent a cavity 40 that forms the tube 16. The cavity 40 communicates with a cavity 42 which forms the body 12 of the component. With the lip seal 20 or 20a mounted as shown in FIG. 5, plastic is injected into the cavities of the mold to form the body 12 and tube 16 in situ within the lip seal such that the lip seal is on the periphery of the tube.

It can thus be seen that there has been provided a transmission filter component and the method of making the component wherein the lip seal is not added by an additional or separate operation and wherein the need is eliminated for closely maintaining certain critical dimensions of the outer diameter of the outlet tube.

What is claimed is:

1. In the manufacture of a plastic component having a body including a tubular extension having a free end portion with an annular external lip seal on an exterior circumferential surface of the free end portion of the tubular extension, the method comprising providing an annular external lip seal having an inner annular surface and an outer annular surface and a pair of opposite radial end surfaces, providing a first mold cavity having a portion for defining the body of the component and a second cavity communicating with the first cavity for defining the tubular extension, positioning said annular lip seal in the cavity defining the tubular extension such that said inner annular surface of said annular seal and a portion of each of said radial end surfaces of said annular seal are exposed to said first mold cavity defining said tubular extension, and injecting molten plastic resin in said first cavity and said second cavity to define the plastic component with the lip seal positioned on the free end portion of said tubular extension, wherein said plastic resin is molded on the inner annular surface of said annular lip seal and the exposed portions of said radial end surfaces, providing annular recesses adjacent the exposed portions of said radial end surfaces of said seal in said second cavity and said step of positioning said lip seal comprising positioning said lip seal such that when the molten plastic resin is injected, annular flanges are formed in the respective said recesses of said second cavity on the respective exposed portions of said radial end surfaces of said annular lip seal, said flanges engaging the respective said radial end surfaces of said annular seal.

2. The method set forth in claim 1 wherein said plastic component is a part of an automotive transmission filter.

* * * * *